US006628969B1

United States Patent
Rilling

(10) Patent No.: US 6,628,969 B1
(45) Date of Patent: Sep. 30, 2003

(54) ONE-TUNER ADAPTIVE ARRAY

(76) Inventor: Kenneth F. Rilling, 1190 Crestline Dr., Cupertino, CA (US) 95014

( * ) Notice: Subject to any disclaimer, the term of this patent is extended or adjusted under 35 U.S.C. 154(b) by 403 days.

(21) Appl. No.: 09/652,981

(22) Filed: Aug. 31, 2000

Related U.S. Application Data

(60) Provisional application No. 60/152,669, filed on Sep. 7, 1999.

(51) Int. Cl.$^7$ .............................. H04B 1/38; G01S 3/16
(52) U.S. Cl. .................... 455/561; 455/562; 455/63; 455/296; 342/380; 342/383
(58) Field of Search ................... 455/561, 562, 455/63, 296; 342/380, 383, 372; 375/136, 148, 347, 349

(56) References Cited

U.S. PATENT DOCUMENTS

| | | | | |
|---|---|---|---|---|
| 4,079,379 A | * | 3/1978 | Piesinger | 342/368 |
| 4,280,128 A | * | 7/1981 | Masak | 342/380 |
| 4,347,627 A | | 8/1982 | Alter | 455/136 |
| 4,635,063 A | * | 1/1987 | Chang et al. | 342/380 |
| 4,736,460 A | | 4/1988 | Rilling | 455/283 |
| 4,752,969 A | | 6/1988 | Rilling | 455/278 |
| 4,792,992 A | * | 12/1988 | Rinderle | 455/239.1 |
| 4,797,950 A | | 1/1989 | Rilling | 455/276 |
| 4,872,016 A | | 10/1989 | Kress | 342/380 |
| 4,959,653 A | * | 9/1990 | Ganz | 342/17 |
| 5,289,194 A | * | 2/1994 | Schlosser | 342/378 |
| 5,361,294 A | * | 11/1994 | Lee et al. | 455/561 |
| 5,608,409 A | | 3/1997 | Rilling | 342/380 |
| 5,722,086 A | * | 2/1998 | Teitler et al. | 455/561 |
| 6,064,338 A | * | 5/2000 | Kobayakawa et al. | 342/378 |
| 6,188,915 B1 | * | 2/2001 | Martin et al. | 455/562 |
| 6,191,736 B1 | * | 2/2001 | Yukitomo et al. | 342/383 |
| 6,240,149 B1 | * | 5/2001 | Yukitomo et al. | 375/347 |

OTHER PUBLICATIONS

Widrow, B., et al., Adaptive Antenna systems, Proceedings of the IEEE, vol. 55, No. 12, Dec. 1967, pp. 2143–2159.

Wittneben, A. and Dettmar, U., A Low Cost Noncoherent Receiver with Adaptive Antenna Combining For High Speed Wireless Lans, 47$^{th}$IEEE Vehicular Technology Conference, 1997, pp 173–177.

Monzingo, rober A. and Miller, Thomas W., *Introduction to Adaptive Arrays*, John Wiley & Sons, New York, 1980.

Lange, Habil F. H., *Correlation Techniques*, Iliffe Books Ltd, London abd D. Van Nostrad Company, Inc., Princeton, New Jersey, 1967.

* cited by examiner

Primary Examiner—Vivian Chin
Assistant Examiner—Kamran Afshar
(74) Attorney, Agent, or Firm—Allston L. Jones

(57) ABSTRACT

The present invention reduces the number of tuners required by an adaptive array that reduces interference in the selected channel of the received desired signal with signals present outside the selected channel bandpass, where the adaptive array includes antennas for generating wideband input signals, weights for generating weighted wideband input signals, adder to sum the weighted wideband input signals, bandpass filter to remove signals from the adder output signal outside the bandpass of the selected channel, feedback function to generate the feedback signal from the bandpass filter output signal, a weight calculator for each weight which includes correlating the wideband signal coupled from the antenna with the feedback signal to generate the weight value. The bandpass filter removes the signals outside the selected channel bandpass, and the weights adapt to reduce interference in the selected channel bandpass. Additionally, the adder output signal can be down converted to IF to generate the IF summed signal, which is bandpass filtered at the IF bandpass. The bandpass filter output signal is applied to the IF feedback function to generate the IF feedback signal. The IF feedback signal is up converted back to the RF frequency of the selected RF channel and coupled to all the weight calculators, where all the RF channels down convert to the same IF frequency.

21 Claims, 6 Drawing Sheets

ONE-TUNER ADAPTIVE ARRAY

CROSS REFERENCES

This application claims priority to one U.S. Provisional Application, Serial No. 60/152,669 filed Sep. 7, 1999, incorporated herein by reference.

TECHNICAL FIELD

The present invention relates to the use of adaptive arrays in communications receivers and is particularly directed to reducing the number of tuner components, space requirements, energy consumption and improved performance of the adaptive array.

BACKGROUND OF THE INVENTION

A common problem in communications is the corruption of the received signal by multipath, co-channel, adjacent channel or other interference that reduces reception quality. One approach well known in the art for reducing the effects of multipath and other interference is the adaptive array (see for example, Widrow, B. & others, "Adaptive array Systems", Proceedings of the IEEE, Vol. 55, No. 12, December 1967, pp. 2143–2159; Monzingo, Robert A. and Miller, Thomas W., Introduction to Adaptive Arrays, John Wiley & Sons, New York, 1980; U.S. Pat. Nos. 4,736,460 and 4,797,950 by Kenneth Rilling).

One problem with current adaptive arrays is that they require a large number of tuner components that occupy space, consume power, generate heat and cause inconsistencies from antenna channel to antenna channel. This can be a particularly significant problem for physically small and battery powered portable receivers. In many communications systems, the received desired signal has signals in adjacent frequency channels or adjacent frequency bands. To reduce the interference from these adjacent channel and adjacent band signals, bandpass filters or tuning bandpass filters are used to select the frequency channel of the desired signal and reject the adjacent channel and adjacent band signals. Typically for an adaptive array with N antennas, N tuners are used, where a tuner typically includes a bandpass filter (tuning bandpass filter) and a pre-amplifier. If the adaptive array is implemented at IF (intermediate frequency), each tuner includes a mixer to down convert the RF (radio frequency) signals to IF. Reducing the number of tuners required by the adaptive array increases the value of the adaptive array in solving a receiver interference problem, particularly in physically small and battery powered portable receivers. Reducing the number of tuners also reduces the inconsistencies from antenna channel to antenna channel. An additional problem with many current adaptive array implementations is that they can be difficult to use with direct down conversion receivers without compromising the advantage of lower cost.

SUMMARY OF INVENTION

The present invention reduces the number of tuners required by an adaptive array in an environment with signals outside the selected channel bandpass from N to one. Signals received by the N antennas are split and delayed in time by a tapped delay line, weighted and summed at RF. The summed signal is then bandpass filtered to remove signals outside the selected channel bandpass to generate the adaptive array output signal. The adaptive array output signal is coupled to the feedback function to generate the feedback signal. The first input signal to each weight calculator is the associated time delayed wideband signal derived from the associated antenna. The feedback signal is then coupled as the second input signal of each weight calculator for generating the weight value. The signals outside the frequency bandpass of the selected channel are uncorrelated with the components of the feedback signal. As a result, the signals outside the selected channel bandpass do not contribute to the value of the weight, causing the adaptive array to use its degrees of freedom to reject interference in the selected channel bandpass, similar to an adaptive array with N tuners.

In another embodiment of the present invention the summed signal is down converted to IF by a down converter mixer to generate the IF summed signal. The IF summed signal is to the IF bandpass filter, to remove all IF signals outside the bandpass of the selected channel. The output signal of the IF bandpass filter is applied to the IF feedback function to generate the IF feedback signal. The IF frequency is the same for all selected channels. The IF feedback signal is then up converted by another mixer back to the RF frequency of the selected channel RF feedback signals. The output signal of the up converter is coupled as the second input signal of each weight calculator. Each weight calculator correlates the feedback signal with the associated wideband signal from the output of the associated tapped delay line to generate the weight value.

The present invention reduces the number of tuners, space requirements, and power requirements.

DETAILED DESCRIPTION OF THE INVENTION

An object of the present invention is to reduce the number of tuners required to implement an adaptive array when other signals are present outside the bandpass of the selected channel of the desired signal.

Another object of the present invention is to reduce the number of tuners required to implement an adaptive array when other signals are present outside the frequency bandpass of the selected channel of the desired signal to reduce power consumption, heat generation, cost, and space requirements.

Another object of the present invention is to improve the performance of the adaptive array by reducing component caused inconsistencies from antenna channel to antenna channel.

Another object of the present invention is to make the adaptive array compatible with a direct conversion receiver without significantly reducing the cost advantage of direct conversion receivers.

Figure 1:
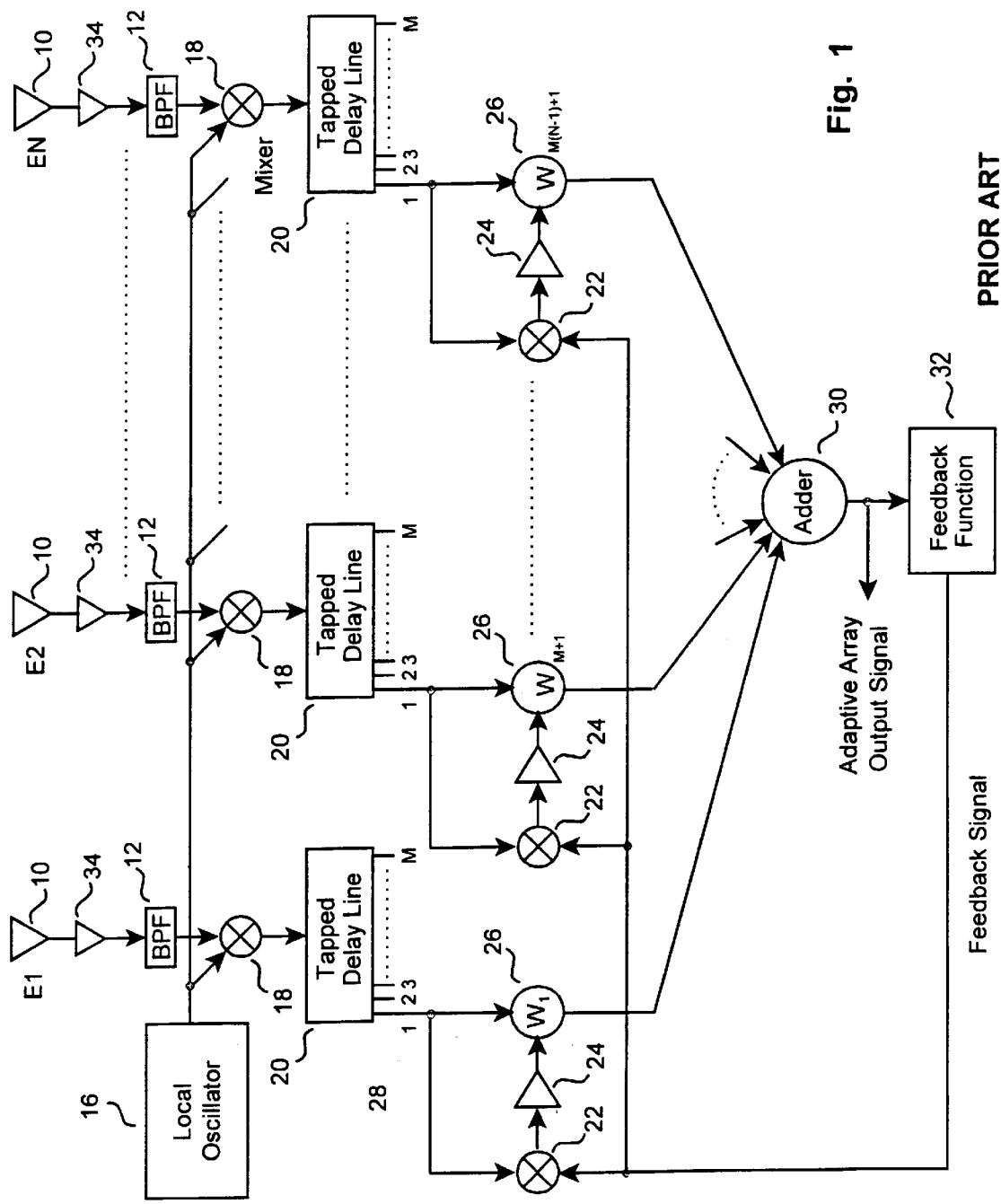
FIG. 1 is a block diagram of a prior art adaptive array.

Typically, communications receiving systems using an adaptive array include a tuner for each antenna of the adaptive array. FIG. 1 shows a typical prior art adaptive array for a receiver in a communications system with other signals present in the adjacent frequency channels of the system or adjacent frequency bands. The RF signals are received by each of the N antennas 10. Each one of the N pre-amplifiers 34 accept the output signal of the associated antenna and amplifies the received signal. The output signal of each pre-amplifier 34 is coupled to the input of the associated one of N bandpass filters 12 to reject signals outside the selected channel bandpass. The output signal of each bandpass filter 12 is coupled to the input of the associated mixer 18. Using the signal from local oscillator 16 as a second input, each the N mixers 18 down converts the bandpass filter output signal to IF. The combination of the associated pre-amplifier 34, bandpass filter 12, and mixer 18 each constitute a tuner. FIG. 1 has N tuners, one for each antenna 10. The output signal of each mixer 18 is coupled to the input of an associated tapped delay line 20, which generates M output signals. Each of the output signals of each tapped delay line 20 is coupled to the first input terminal of associated weight 26 that weights the signal. The output signal of each weight 26 is coupled to an associated input terminal of adder 30 which sums the weighted signals. The output signal of adder 30 is coupled to the input terminal of feedback function 32 which generates the feedback signal. The feedback signal is coupled to the second input terminal of each multiplier 22. The first input terminal of each multiplier 22 is coupled to the associated output signal of the associated delay line 20. Each multiplier 22 multiplies the associated output signal of the associated delay line 20 with the feedback signal. The output signal of each multiplier 22 is coupled to the input terminal of an associated integrator 24 which generates the weighting signal. The output signal of each integrator 24 is coupled the second input terminal of the associated weight 26 to provide the weighting value. Each of multipliers 22 and the associated integrator 24 form a correlator. The output signal of adder 30 is the adaptive array output signal.

In the present patent application, "channel" is defined as the frequencies occupied a specific radio communications or broadcast signal when transmitted. Generally, this predefined the system design. Often a communications or broadcast system has a number of channels that are at adjacent frequencies from which a channel is selected for a specific signal. The selected channel bandpass is defined as the bandwidth of the selected channel at the channel frequency.

In FIG. 1, the signal received by each antenna is bandpass filtered so that the signals in the selected channel bandpass are weighted. The signals outside the selected channel bandpass are rejected. Without bandpass filters 12, the signals outside the selected channel bandpass enter the adaptive array and are seen by the adaptive array as interference signals which the adaptive array will try to reject. In some adaptive array designs which capture the strongest signal as the desired signal, without bandpass filters 12, a signal outside the selected channel bandpass which is stronger than the desired signal will capture the adaptive array, for example, when a constant modulus algorithm (CMA) adaptive array is used with signals with constant modulus.

In FIG. 1, the first input signal to each multiplier 22 is from the associated delay line 20 output, having, nominally, the same bandwidth as bandpass filter 12. The second input signal of each multiplier 22 is the feedback signal, which also, has nominally, the same bandwidth as the bandpass filter 12. Each multiplier 22 multiplies the associated input signals, multiplying the frequency components of the two input signals. The uncorrelated components produce products that are integrated to zero by the associated integrator 24 and do not contribute to the value of the associated weight. The correlated components, in general, integrate to non-zero values and produce the weight value that is applied to the associated weight 26. The adaptive array converges to a set of values for weights 26 that reduce the undesired interference signal(s) inside the selected channel bandpass to enhance reception of the desired signal.

Reducing the number of tuners in an adaptive array is very advantageous because it reduces the component count, improves reliability, reduces space requirements, reduces power consumption, reduces heat generation, and reduces antenna channel to antenna channel differences in the adaptive array. Reducing antenna channel to antenna channel differences improves the performance of the adaptive array and receiver. Reducing the number of tuners is particularly advantageous in receivers that are physically small because of the small form factor limit space. In the case of battery powered units, power consumption is reduced.

Figure 2:
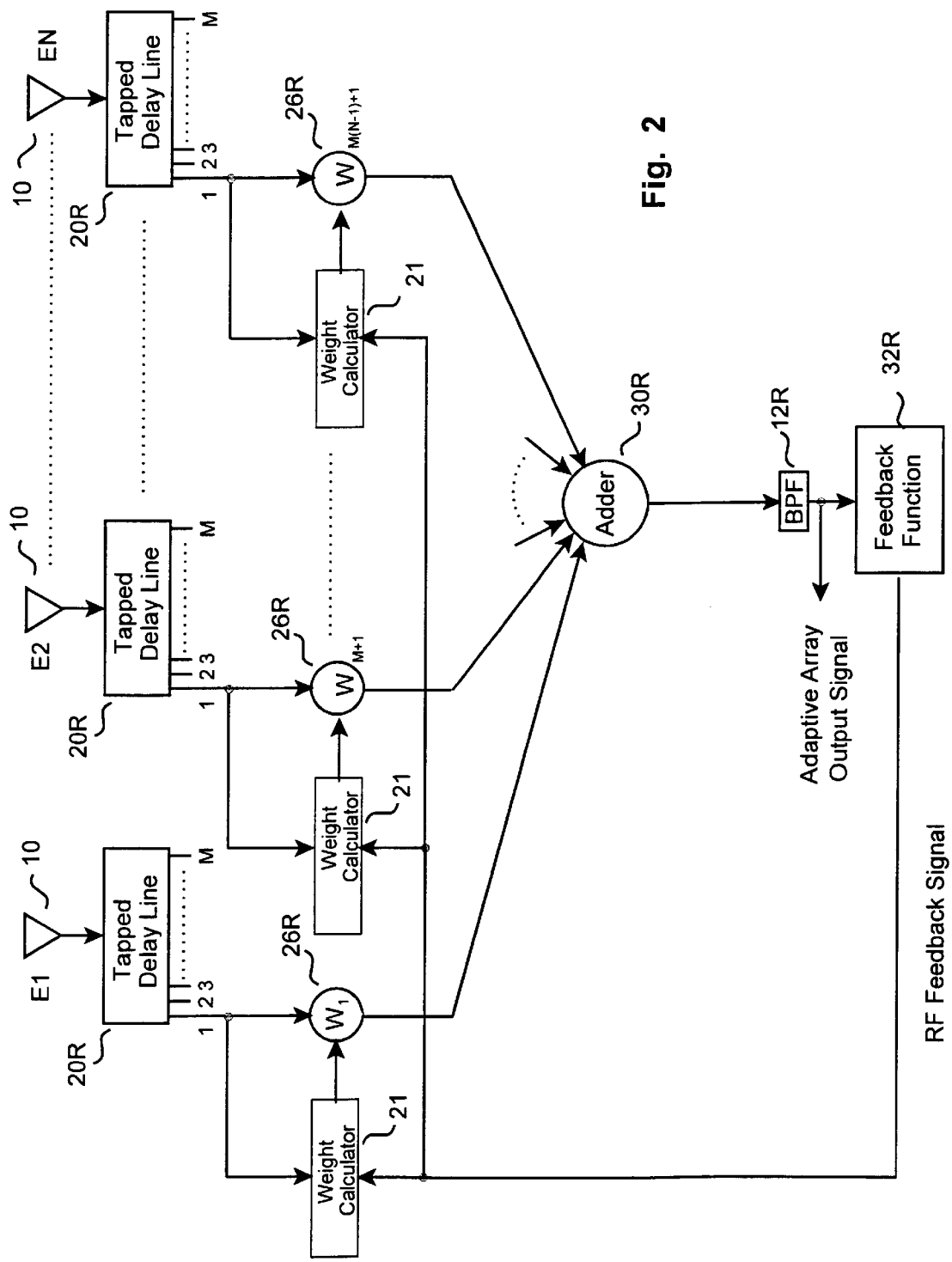
FIG. 2 shows a block diagram of a one tuner RF adaptive array.

FIG. 2 shows the preferred embodiment of the present invention. The signals over the full frequency band of the N antennas elements contain the desired signal and other signals in the selected channel bandpass, adjacent channels and adjacent bands. The output terminal of each antenna element 10 is coupled to the input terminal of the associated tapped delay line 20R. Tapped delay line 20R can be replaced by an equivalent phase shifter, such as a 90 degree hybrid. Each tapped delay line 20R generates M time shifted signals of the associated antenna signal. Each output terminal of each tapped delay line 20R is coupled to the first input terminal of the associated weight calculator 21 and first input terminal of associated weight 26R. The weight calculator 21 generates the weighting signal and is discussed below. The output terminal of calculator weight 21 is coupled to the second input terminal of the associated weight 26R to weight the associated output antenna signal from the tapped delay line 20R. The output terminal of each weight 26R is coupled to an associated input terminal of adder 30R to sum all the weighted signals. The output terminal of adder 30R is coupled to the input terminal of bandpass filter 12R to reject all signals not in the selected channel bandpass. The output signal of bandpass filter 12R is the adaptive array output signal. The output terminal of bandpass filter 12R is coupled to the input terminal of feedback function 32R to generate the RF feedback signal. Feedback function 32R is discussed below. The output terminal of feedback function 32R is coupled to the second input terminal of each weight calculator 21 to generate the various weight value signals.

The adaptive array in FIG. 2 weights the received signals over the resulting effective bandwidth of the antennas 10 and tapped delay lines 20R. The weighted frequency components of all the signals are summed by adder 30R. Bandpass filter 12R removes signals outside the bandpass of the selected channel to generate the adaptive array output signal. The adaptive array output signal that is applied to feedback function 32R has the bandwidth and frequencies of bandpass filter 12R and the selected channel. The feedback signal applied to each weight calculator 21 has nominally, the bandwidth and frequencies of bandpass filter 12R. The second input terminal of the associated weight 26R receives the weight value signal from the output terminal of the associated weight calculator 21.

Figure 3:
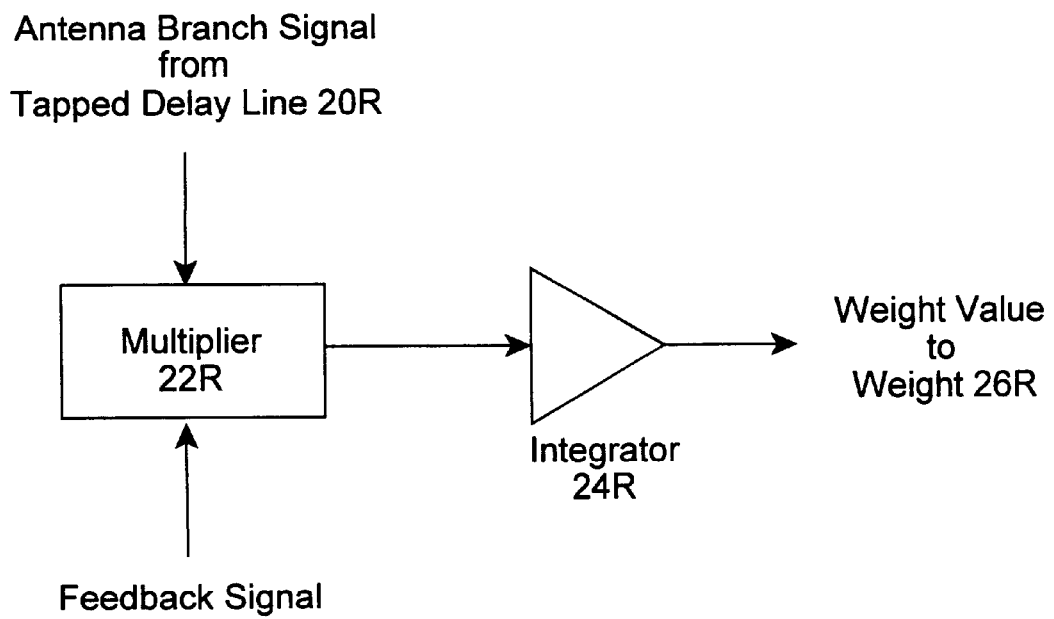
FIG. 3 shows a block diagram of a weight calculator implementation.

Each weight calculator 21 includes a correlator (correlators are discussed below). FIG. 3 shows one type of correlator that includes multiplier 22R and integrator 24R serially connected in the stated order. The antenna branch signal is applied to the first input terminal of multiplier 22R, and the feedback signal is applied to second input terminal of multiplier 22R. The output terminal of multiplier 22R is coupled to the input terminal of integrator 24R. The output signal of the integrator 24R is the weight value and output signal for some implementations of weight calculator 21. Multiplier 22R multiplies the two input signals, and integrator 24R integrates the resultant multiplied signal from multiplier 22R. Uncorrelated components of the two input signals integrate to zero. Correlated components of the two input signals, in general, integrate to non zero values.

Correlators are well known in the art. They can be implemented in both analog and digital form. Information on correlators can be found in the literature, including adaptive array literature, adaptive filter literature, matched filter literature and in *Correlation Techniques* by Habil F. H. Lange, Iliffe Bookd Ltd, London and D. Van Nostrand, company, Inc., Princeton N.J., 1967.

In FIG. 2, the wideband signal from the antenna input branch and the feedback signal are correlated by weight calculator 21. Frequency components of the wideband signal that are in the bandpass of the selected channel can be correlated with the feedback signal. In general, correlated components contribute to the weight value. Uncorrelated components do not contribute to the weight value.

The adaptive array converges to the desired weight values to reduce interference, such as multipath, cochannel, or adjacent channel in the selected channel bandpass in a manner similar to the adaptive array's N tuner counter part in FIG. 1. The adaptive array in FIG. 2 ignores the signals in the adjacent channels and adjacent bands. The bandpass filter 12R rejects the signals in the adjacent channels and adjacent bands. As a result, signals outside the selected channel bandpass are not in the adaptive array output signal. The adaptive array output signal is in the bandpass of the selected channel.

In the present invention, signals outside the selected channel bandpass enter the adaptive array. By making the bandwidth of the feedback signal that is applied to the correlators of weight calculators 21 the same as the selected channel bandpass, the correlation of the feedback signal with the antenna branch wideband signal containing adjacent channel or adjacent band signals produces cross terms that are uncorrelated and integrate to zero in the correlator, thus, not affecting the weight calculation. Signals within the selected channel bandpass can be correlated with the feedback signal and produce non-zero values that contribute to the weight value. In the present invention, the degrees of freedom of the adaptive array are used to reject interference signals in the selected channel bandpass.

Because there are fewer component inconsistencies antenna channel to antenna channel, the adaptive array of the present invention performs better.

Alternatively, the adaptive array can be implemented with the antenna branch input signals being bandpass filtered by associated bandpass filter, and with the shown bandpass filter 12R removed from the output signal path of the adaptive array. In this alternative implementation, the feedback signal contains all the signals outside the selected channel bandpass.

A preamplifier can be added for better signal to noise. A pre-amplifier can be added in series in front of bandpass filter 12R in FIG. 2. Alternatively, a separate pre-amplifier can be added in series after each antenna element (E1 to EN) in FIG. 2. For IF down conversion, a mixer can be added at the adaptive array output terminal.

The adaptive array in FIG. 2 has fewer tuner components than the adaptive array in FIG. 1. The adaptive array in FIG. 2 has N-1 fewer bandpass filters 12 and N-1 fewer preamplifiers 34 (when used) than a standard adaptive array implementation, as shown in FIG. 1. The present invention in FIG. 2 can be applied to direct down conversion receivers. In an IF adaptive array implementation, the adaptive array of the present invention has N-1 fewer mixers 18 than a standard IF adaptive array. This is one embodiment of the present invention.

In FIG. 2, the feedback function. 32R, which generates the feedback signal for calculating the weights, can be any appropriate function matched to weight calculators 21 which together are defined by the type of adaptive array, such as constant modulus algorithm, least means square (LMS), etc. For example, when the desired signal modulation has a constant modulus, weight calculator 21 can be the correlator in FIG. 3 with the feedback function 32R being an amplitude limiter (see U.S. Pat. No. 4,797,950). For a least means square (LMS) adaptive array when a reference signal is available, each weight calculator 21 consists of the correlator in FIG. 3 and the feedback function 32R which subtracts the reference signal from the adaptive array output signal to generate the feedback signal (see Widrow above).

The embodiment of the present invention in FIG. 2 shows only one family of adaptive arrays. It will be clear to those skilled in the art that the present invention applies to other types of adaptive arrays in signal environments with signals outside the selected channel bandpass.

Figure 4:
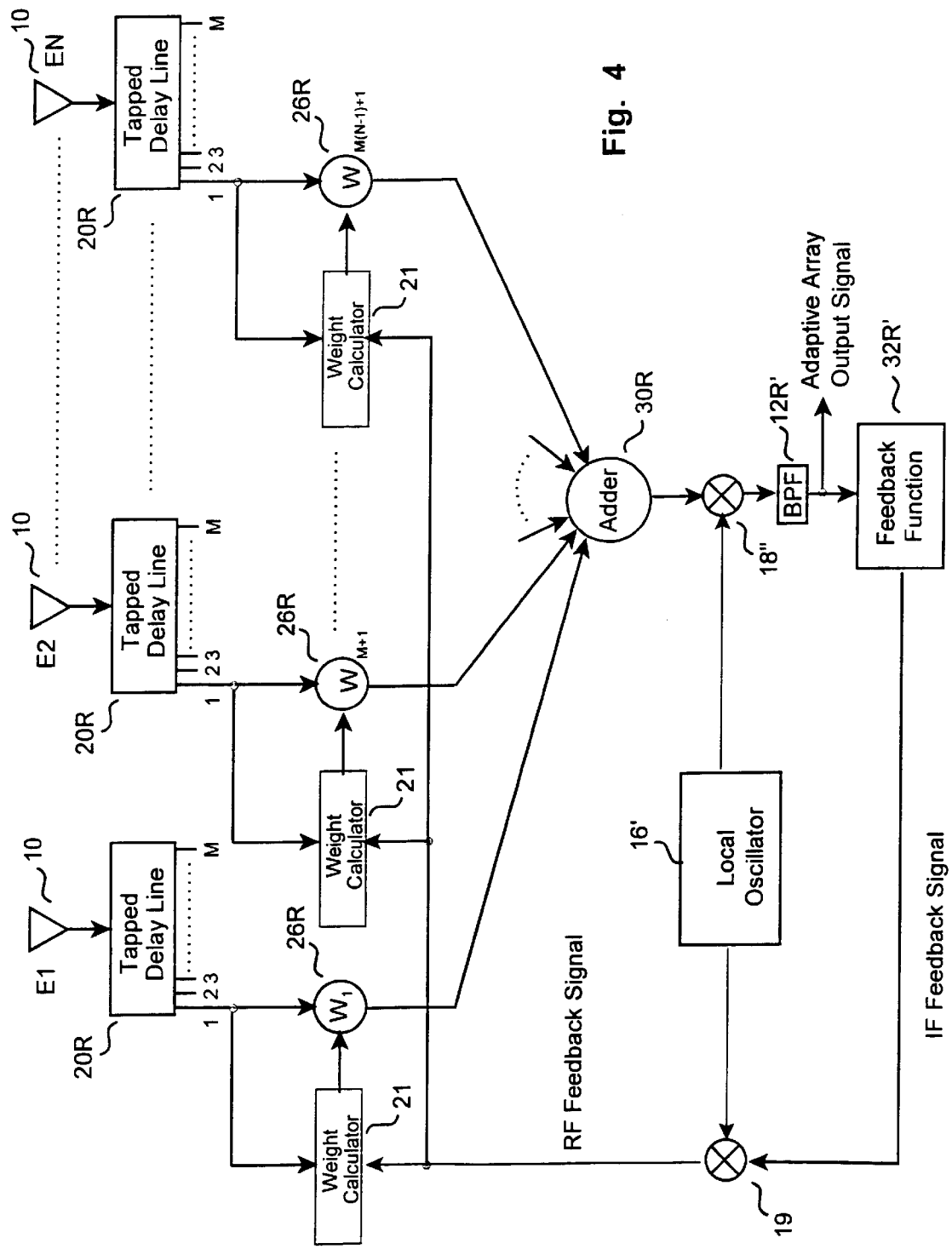
FIG. 4 shows a block diagram of a one tuner adaptive array with an IF feedback function.

FIG. 4 shows another embodiment of the present invention. The signals over the full frequency band of the N antennas elements contain the desired signal and other signals in the selected channel bandpass, adjacent channels and adjacent bands. The output terminal of each antenna element 10 is coupled to the input terminal of the associated tapped delay line 20R. Tapped delay line 2OR can be replaced by an equivalent phase shifter, such as a 90 degree hybrid. Each tapped delay line 20R generates M time shifted signals of the associated antenna signal. Each output terminal of each tapped delay line 20R is coupled to the first input terminal of the associated weight calculator 21 and first input terminal of associated weight 26R. The weight calculator 21 generates the weighting signal. The output terminal of calculator weight 21 is coupled to the second input terminal of the associated weight 26R to weight the associated output antenna signal from the tapped delay line 20R. The output terminal of each weight 26R is coupled to an associated input terminal of adder 30R to sum all the weighted signals. The output terminal of adder 30R is coupled to the first input terminal of down converter 18". The output terminal of down converter 18" is coupled to the input terminal of bandpass filter 12R'. The first output terminal of local oscillator 16' is coupled to the second input terminal of down converter 18" to down convert the RF output signal from adder 30R to IF. Bandpass filter 12R' filters out signals outside the IF bandpass of the receiver. Bandpass filter 12R' has a fixed bandpass and is the same for all selected RF channels. Bandpass filter 12R can be incorporated into down converter 18" in some implementations of the down converter. The output signal of bandpass filter 12R' is the IF adaptive array output signal. The output terminal of bandpass filter 12R' is coupled to the input terminal of feedback function 32R' to generate an IF feedback signal. The output terminal of feedback function 32R' is coupled to the first input terminal of up converter 19. The second output terminal of local oscillator 16' is coupled to the second input terminal of up converter 19 to up convert the IF feedback signal back to the RF bandpass and frequency of the selected channel, generating the RF feedback signal. The output terminal of the up converter 19 is coupled to the second input terminal of each weight calculator 21.

In FIG. 4, the adaptive array weights the received signals over the resulting effective bandwidth of the antennas 10 and tapped delay lines 20R. The weighted frequency components of all the signals are summed by adder 30R. The output signal from adder 30R is down converted to IF by down converter 18". All selected RF channels are down converted to the same IF. The output signal from down converter 18" is bandpass filtered by bandpass filter 12R' to remove all signals outside the bandpass of the IF. Bandpass filter 12R' removes all down converted RF signals that were outside the bandpass of the selected channel (at RF). The bandpass filter 12R' output signal is coupled to feedback function 32R', which generates the IF feedback signal. The IF feedback signal is up converted back to the frequency and bandpass of the selected channel (at RF) to generate the RF feedback signal. The RF feedback signal has nominally, the bandwidth and frequencies of bandpass filter 12R'. The RF feedback is coupled to each weight calculator 21 and correlated with the associated broadband antenna signal from the associated tapped delay line 20 output. Received signals in the selected channel bandpass can be correlated with signal components of the RF feedback signal. Received signals outside the selected channel bandpass do not correlate with signal components of the RF feedback signal. Correlated signals contribute to the weight values. As a result, the adaptive array uses its degrees of freedom to reject interference signals with frequencies in the selected channel bandpass. It does not treat signals outside the selected channel bandpass as interference signals. Bandpass filter 12R' removes all signals outside the IF bandpass so the adaptive array output signal does not include signals outside the selected channel bandpass.

In FIG. 4, bandpass filter 12R' and feedback function 32R' do not change in frequency when the selected channel and associated bandpass frequencies are changed, making implementation of bandpass filter 12R' and feedback function 32R' simpler to implement in some cases.

Figure 5:
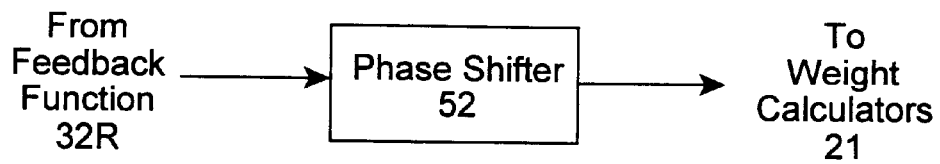
FIG. 5 shows a block diagram of feedback signal phase shifter.

It is often necessary to adjust the phase of the feedback signal to optimize the performance of the adaptive array. FIG. 5 shows a phase shifter 52 that automatically adjusts to the correct phase for each selected channel. The input terminal of phase shifter 52 is coupled to the output terminal of feedback function 32R in FIG. 2, and the output terminal of phase shifter 53 is coupled to each weight calculator 21 in FIG. 2 to shift the phase of the feedback signal to an optimal value for the selected channel.

Similarly, for FIG. 4, the input terminal of a phase shifter 52' is coupled to the output terminal of up converter 19, and the output terminal of phase shifter 52' is coupled to the second input terminal of each weight calculator 21 to shift the phase of the RF feedback signal to an optimal value for the selected channel. Similarly, for FIG. 4 at IF, an IF phase shifter 52" can be implemented serially between bandpass filter 12R' and feedback function 32R' or serially between feedback function 32R' and up converter 19 to shift the phase to an optimal value for each selected channel.

Figure 6:
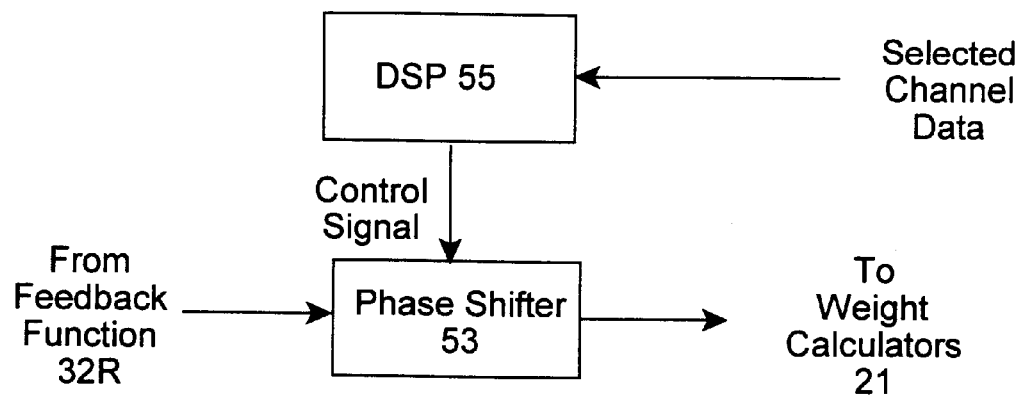
FIG. 6 shows a block diagram of a signal controlled feedback signal phase shifter.

FIG. 6 shows an implementation of a phase shifter 52. Here a control voltage is applied to the phase shifter 53 to adjust the phase for the selected channel to the optimal value. A DSP or other electronics can store and generate the proper control signal for each channel. In FIG. 6, DSP 55 receives the selected channel data as an input. DSP 55 computes the optimal phase shift for the selected channel and generates the control signal. The control signal is coupled to the input control signal terminal of phase shifter 53 to adjust the phase.

It would be clear to a person skilled in the art that the various embodiments of the present invention can be implemented in either analog, digital, analog/digital hybrid, software/digital, etc., also as partially illustrated below.

Figure 7:
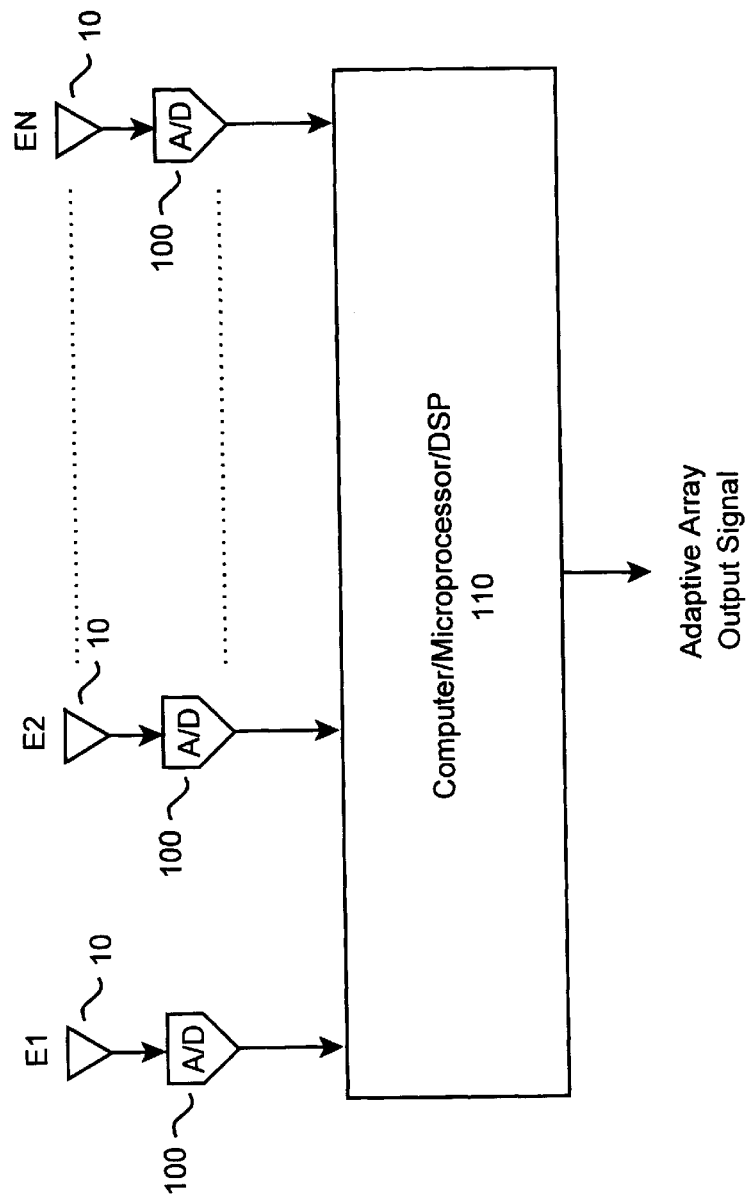
FIG. 7 shows a block diagram of a computer/DSP/microprocessor implementation of the present invention.

FIG. 7 shows the present invention implemented with the Use of a computer, microprocessor, or digital signal processors (DSP) 110. The radio signals are received by antennas 10, with each antenna 10 coupled to the input terminal of an associated analog-to-digital (A/D) converter 100. The output port of each A/D converter 100 is coupled to the associated input port of computer/microprocessor/DSP 110. The adaptive array algorithm for a specific embodiment of the present invention is implemented in the computer/microprocessor/DSP 110. There are many software implementations possible for adaptive arrays of the present invention.

The present invention applies to adaptive arrays for which knowledge of the power of signals in the selected channel bandpass is not required from the adaptive array, per se, and applies to adaptive arrays where signals outside the select channel bandpass cannot capture control of any adaptive array components to reduce performance significantly.

From the foregoing description, it will be apparent that the invention disclosed herein provides novel and advantageous implementations and performance improvements for adaptive arrays. It will be understood by those familiar with the art, the invention may be embodied in other specific forms without departing from the spirit or essential characteristics thereof.

What is claimed is:

1. Method for reducing the number of tuners in an adaptive array for reducing interference in the selected channel of the desired signal of a receiver, where signals are present outside the bandpass of said selected channel and where said adaptive array has a plurality of antennas that provide wideband input signals, each one of said wideband input signals is coupled to weights, output of said weights coupled to input of adder, output of said adder coupled to input of bandpass filter, output of said bandpass filter coupled to input of feedback function, said method comprising the following steps:

a. weighting said wideband input signals with associated said weights to generate weighted wideband input signals;

b. summing each one of said weighted wideband input signals generated in step a. to generate a wideband summed signal;

c. filtering said wideband summed signal generated in step b. to generate the adaptive array output signal in the bandpass of said selected channel;

d. processing said adaptive array output signal generated in step c. with said feedback function to generate the feedback signal;

e. individually correlating each one of said wideband input signals with said feedback signal generated in step d. to generate a separate weight value for each associated one of said weights; and f. adapting said weights to reduce interference in said adaptive array output signal in said selected channel bandpass.

2. A method as in claim 1 wherein:
said adaptive array further includes:
   a computing system; and
   an algorithm representation of said adaptive array;
step a. further includes the step of:
   g. generating a digital representation of each one of said wideband input signals.

3. Method as in claim 1, wherein:
said adaptive array is included with receiver for modulated signal with constant modulus; and
step d. further includes the step of:
   g. amplitude limiting said selected channel signal generated in step c. to generate said feedback signal.

4. Method as in claim 1 further includes the step of:
   g. adjusting the phase of said feedback signal generated in step d. to optimize the performance of said adaptive array.

5. Method for reducing the number of tuners in an adaptive array for reducing interference in the selected channel of the desired signal of a receiver, where signals are present outside the bandpass of said selected channel and where said adaptive array has a plurality of antennas that provide wideband input signals, each one of said wideband input signals is coupled to weights, output of said weights coupled to input of adder, output of said adder coupled to said down converter, output of said down converter coupled to input of bandpass filter, output of said bandpass filter coupled to input of feedback function, said method comprising of the following steps:
   a. weighting said wideband input signals with associated one of said weights to generate weighted wideband input signals;
   b. summing each one of said weighted wideband input signals generated in step a. to generate a wideband summed signal;
   c. down converting RF frequency to IF frequency of said wideband summed signal generated in step b. to generate IF signal;
   d. filtering said IF signal generated in step c. to generate the adaptive array output signal with bandwidth of said selected channel;
   e. processing said adaptive array output signal generated in step d. by said feedback function to generate the IF feedback signal for said adaptive array;
   f. up converting said IF frequency to said RF frequency of said IF feedback signal generated in step e. to generate RF feedback signal;
   g. individually correlating each one of said representations of said wideband input signals with said RF feedback signal generated in step f. to generate a separate weight value for each associated one of said weights; and
   h. adapting said weights to reduce interference in said adaptive array output signal in said selected channel bandpass.

6. Method, as in claim 5, wherein:
said adaptive array is included in a receiver for a modulated signal having a constant modulus; and
step e. further includes the step of:
   g. amplitude limiting said adaptive array output signal generated in step d. to generate said IF feedback signal.

7. Method as in claim 5 further includes the step of:
   g. adjusting the phase of said feedback signal generated in step e. to optimize the performance of said adaptive array.

8. Apparatus for reducing the number of tuners in an adaptive array for reducing interference in the selected channel of desired signal of a receiver, where signals are present outside the bandpass of said selected channel, where said adaptive array includes N antennas, where N is at least 2, that generate wideband input signals, each one of said N antennas is coupled to M weights and M correlators, where M is at least 2, for an adaptive array total of NM weights and correlators, said apparatus including:
   N antennas with an output terminal to generate a wideband signal at said output terminal;
   NM weights with first input terminal, second input terminals and output terminal with said first input terminal coupled to output terminal of associated one of said N antennas to weight associated said wideband signal to generate weighted wideband signal at said output terminal;
   an adder with NM input terminals and one output terminal, each one of said NM input terminals coupled to output terminal of associated one of said NM weights to sum each weighted wideband signal and generate wideband summed signal at said output terminal;
   a bandpass filter with input terminal and output terminal, said input terminal coupled to output terminal of said adder to generate adaptive array output signal with bandpass of said selected channel at said output terminal;
   a feedback function with at least an input terminal and an output terminal with said input terminal coupled to output terminal of said bandpass filter to receive said adaptive array output signal and generate the feedback signal at said output terminal; and
   NM weight calculators with first input terminal and second input terminal and an output terminal with said first input terminal coupled to said associated one of said N antennas to receive said wideband output signal and said second input terminal coupled to output terminal of said feedback function to receive said feedback signal to correlate said associated wideband signal and said feedback signal to generate weight value signal at said output terminal, said output terminal coupled to said second input terminal of associated one of said NM weights;
   where said NM weights adapt to reduce said interference of said adaptive array output signal in selected channel bandpass.

9. Apparatus, as in claim 8, wherein:
said modulated signal of receiver has constant modulus; and
said feedback function includes a CMA function.

10. Apparatus, as in claim 8, wherein:
said modulated signal of receiver has constant modulus; and
said feedback function includes an amplitude limiter.

11. Apparatus, as in claim 8, further includes a phase shifter with an input terminal and an output terminal, said input terminal coupled to an output terminal of said feedback function to receive said feedback signal and said output terminal coupled to a second input terminal of each one of said weight calculators to optimally adjust the phase of said feedback signal.

12. Apparatus, as in claim 8, where said feedback function subtracts a reference signal from said adaptive array output signal.

13. Apparatus for reducing the number of tuners in an adaptive array for reducing interference in the selected channel of the desired signal of a receiver, where signals are present outside the bandpass of said selected channel, where said adaptive array includes N antennas that generate wideband input signals, with N at least 2, where each one of said N antennas is coupled to M weights and M correlators, M at least 2, for a total of NM weights and weight calculators, said apparatus including:

N antennas with an output terminal to generate a wideband signal at said output terminal;

NM weights with first input terminal, second input terminal and output terminal with said first input terminal coupled to output terminal of associated one of said N antennas to weight associated said wideband signal to generate weighted wideband signal at said output terminal;

an adder with NM input terminals and one output terminal, each one of said NM input terminals coupled to output terminal of associated one of said NM weights to sum each said weighted wideband signal and generate wideband summed signal at said output terminal;

a bandpass filter with input terminal and output terminal, said input terminal coupled to output terminal of said adder to receive said wideband summed signal to generate adaptive array output signal in bandpass of said selected channel at said output terminal;

a feedback function with one input terminal and output terminal with said input terminal coupled to output terminal of said bandpass filter to receive said adaptive array output signal and generate the feedback signal at said output terminal; and NM weight calculators with first input terminal, second input terminal and an output terminal with said first input terminal coupled to said associated one of said N antennas to receive said wideband output signal and said second input terminal coupled to output terminal of said feedback function to receive said feedback signal to correlate said associated wideband signal and said RF feedback signal to generate weight value signal at said output terminal, said output terminal coupled to said second input terminal of associated one of said NM weights;

where said NM weights adapt to reduce said interference of said adaptive array output signal in selected channel bandpass.

14. Apparatus, as in claim 13, wherein:

said modulated signal of receiver has constant modulus; and said feedback function includes a CMA function.

15. Apparatus, as in claim 13, wherein:

said modulated signal of receiver has constant modulus; and said feedback function includes an amplitude limiter.

16. Apparatus as in claim 10, where feedback function includes said least means square feedback function.

17. Apparatus for reducing the number of tuners in an adaptive array for reducing interference in the selected channel of the desired signal of a receiver, where signals are present outside the bandpass of said selected channel, where said adaptive array includes N antennas, N is at least 2, that generate wideband input signals, one of said where N antennas is coupled to M weights and M correlators, and where M is at least 2, for a total of NM weights and weight calculators, said apparatus including:

N antennas with an output terminal to generate a wideband signal at said output terminal;

NM weights with first input terminal, second input terminal and output terminal with said first input terminal coupled to output terminal of associated one of said N antennas to weight associated said wideband signal to generate weighted wideband signal at said output terminal;

an adder with NM input terminals and one output terminal, each one of said NM input terminals coupled to output terminal of associated one of said NM weights to sum each said weighted wideband signal and generate wideband summed signal at said output terminal;

a down converter with first input terminal, second input terminal and output terminal with said first input terminal coupled to output terminal of said adder to receive said wideband summed signal and down convert the RF frequency to IF frequency and generate the IF wideband summed signal at said output terminal;

a bandpass filter with input terminal and output terminal, said input terminal coupled to output terminal of said down convert to receive said IF wideband summed signal to generate adaptive array output signal in bandpass of said selected channel at said output terminal;

a feedback function with one input terminal and output terminal with said input terminal coupled to output terminal of said bandpass filter to receive said adaptive array output signal and generate the IF feedback signal at said output terminal;

an up converter with first input terminal, second input terminal and output terminal with said first input terminal coupled to output terminal of said feedback function to receive said IF feedback signal to up convert IF frequency to RF frequency and generate the RF feedback signal at said output terminal;

a local oscillator with an output terminal, said output terminal coupled to second input terminal of said down converter and second input terminal of said up converter to provide local oscillator signal; and NM weight calculators with first input terminal, second input terminal and an output terminal with said first input terminal coupled to said associated one of said N antennas to receive said wideband output signal and said second input terminal coupled to output terminal of said up converter to receive said RF feedback signal to correlate said associated wideband signal and said RF feedback signal to generate weight value signal at said output terminal, said output terminal coupled to said second input terminal of associated one of said NM weights;

where said NM weights adapt to reduce said interference of said adaptive array output signal in selected channel bandpass.

18. Apparatus, as in claim 17, wherein:

said modulated signal of receiver has constant modulus; and said feedback function includes a CMA function.

19. Apparatus, as in claim 17, wherein:

said modulated signal of receiver has constant modulus; and said feedback function includes an amplitude limiter.

20. Apparatus, as in claim 17, further includes a phase shifter with an input terminal and an output terminal, said input terminal coupled to an output terminal of said feedback function to receive said IF feedback signal and said output terminal coupled to a second input terminal of each one of said up converter to optimally adjust the phase of said IF feedback signal.

21. Apparatus, as in claim 17, wherein said feedback function includes subtracting a reference signal from said adaptive array output signal.

* * * * *